United States Patent
Bae et al.

(10) Patent No.: US 12,476,751 B2
(45) Date of Patent: Nov. 18, 2025

(54) METHODS FOR DYNAMIC HARQ-ACK CODEBOOK WITH MULTIPLE SUB-CODEBOOKS

(71) Applicant: Samsung Electronics Co., Ltd., Suwon-si (KR)

(72) Inventors: Jung Hyun Bae, San Diego, CA (US); Mohammed Karmoose, San Diego, CA (US); Hamid Saber, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 643 days.

(21) Appl. No.: 17/667,391

(22) Filed: Feb. 8, 2022

(65) Prior Publication Data

US 2022/0286246 A1  Sep. 8, 2022

Related U.S. Application Data

(60) Provisional application No. 63/253,874, filed on Oct. 8, 2021, provisional application No. 63/156,504, filed on Mar. 4, 2021.

(51) Int. Cl.
*H04B 7/04* (2017.01)
*H04L 1/1812* (2023.01)
(Continued)

(52) U.S. Cl.
CPC .......... *H04L 5/0044* (2013.01); *H04L 1/1812* (2013.01); *H04L 5/0053* (2013.01)

(58) Field of Classification Search
CPC ................. H04L 5/0044; H04L 1/1854; H04L 25/03898; H04L 1/0008; H04L 1/1614;
(Continued)

(56) References Cited

U.S. PATENT DOCUMENTS 10,404,438 B2 * 9/2019 Park ..................... H04L 1/1812
10,985,877 B2 * 4/2021 Yin ....................... H04L 1/1825
(Continued)

FOREIGN PATENT DOCUMENTS

WO   WO-2019050443 A1 *  3/2019  ........... H04L 1/1614

OTHER PUBLICATIONS

FUJITSU: "Discussion on HARQ-ACK codebook," R1-1717719, 3GPP, 3rd Generation Partnership Project, Oct. 2017, 4 pages, Retrieved from the Internet: URL: http://www.3gpp.org/ftp/Meetings_3GPP_SYNC/RAN1/Docs/ (Year: 2017).*
(Continued)

*Primary Examiner* — Sithu Ko
(74) *Attorney, Agent, or Firm* — Lewis Roca Rothgerber Christie LLP (57) ABSTRACT

A system and method for handling acknowledgments in a wireless system. In some embodiments, the method includes, receiving, by a User Equipment (UE), one or more first transmissions; decoding, by the UE, the first transmissions, to generate a first sub-codebook including one or more corresponding Hybrid Automatic Repeat Request Acknowledgement (HARQ ACK) bit strings each having a first length; receiving, by the UE, one or more second transmissions; decoding, by the UE, the second transmissions, to generate a second sub-codebook including one or more corresponding HARQ ACK bit strings each having a second length, greater than the first length; receiving, by the UE, one or more third transmissions; and decoding, by the UE, the third transmissions, to generate a third sub-codebook including one or more corresponding HARQ ACK bit strings each having a third length, greater than the second length.

20 Claims, 8 Drawing Sheets

(51) Int. Cl.
*H04L 5/00* (2006.01)
*H04W 72/04* (2023.01)

(58) Field of Classification Search
CPC ... H04L 1/1812; H04L 1/1861; H04L 1/1896; H04L 5/001; H04L 5/0053; H04L 5/0055; H04W 72/23
See application file for complete search history.

(56) References Cited

U.S. PATENT DOCUMENTS

| | | | | |
|---|---|---|---|---|
| 11,050,542 | B2* | 6/2021 | Park | H04L 5/0055 |
| 11,381,351 | B2* | 7/2022 | Liu | H04L 1/1861 |
| 11,469,857 | B2* | 10/2022 | Zhou | H04L 1/1812 |
| 11,564,223 | B2* | 1/2023 | Moon | H04L 1/1893 |
| 11,824,811 | B2* | 11/2023 | Lei | H04W 28/06 |
| 11,844,103 | B2* | 12/2023 | Khoshnevisan | H04W 72/56 |
| 11,849,479 | B2* | 12/2023 | Nogami | H04L 1/1854 |
| 11,894,783 | B2* | 2/2024 | Sakai | H02M 1/088 |
| 12,101,191 | B2* | 9/2024 | Zhang | H04L 1/1812 |
| 2019/0045489 | A1* | 2/2019 | He | H04W 72/12 |
| 2019/0149271 | A1* | 5/2019 | Yin | H04L 1/1607 370/329 |
| 2019/0150181 | A1* | 5/2019 | Kim | H04L 1/1896 370/329 |
| 2020/0287654 | A1* | 9/2020 | Xi | H03M 13/13 |
| 2020/0374045 | A1* | 11/2020 | Yin | H04B 7/0456 |
| 2021/0014004 | A1* | 1/2021 | Khoshnevisan | H04L 1/1896 |
| 2021/0050950 | A1* | 2/2021 | Zhou | H04W 72/21 |
| 2021/0092759 | A1* | 3/2021 | Xiong | H04W 72/0446 |
| 2021/0176011 | A1* | 6/2021 | Lei | H04L 1/1812 |
| 2021/0259006 | A1* | 8/2021 | Yoshioka | H04W 72/535 |
| 2023/0155790 | A1* | 5/2023 | Liu et al. | H04L 1/1861 370/329 |

OTHER PUBLICATIONS

FUJITSU: "Discussion on HARQ-ACK codebook," R1-1717719, 3GPP, 3rd Generation Partnership Project, Oct. 2017, 4 pages, Retrieved from the Internet: URL: http://www.3gpp.org/ftp/Meetings_3GPP_SYNC/RAN1/Docs/.
EPO Extended European Search Report dated Jul. 26, 2022, issued in European Patent Application No. 22159125.8 (12 pages).

* cited by examiner

FIG. 1A

| Condition | Participation in sub-code |
|---|---|
| With $N_{cells}^{DL,CBG}$ cells:<br>• PDSCH-CodeBlockGroupTransmission is not provided for a cell, or<br>• SPS PDSCH with DCI on any cell<br>• SPS PDSCH release on any cell<br>• TB based PDSCH reception when PDSCH-CodeBlockGroupTransmission is provided for a cell via fallback DCI (FB-DCI) format 1_0 | Sub-codebook 1 |
| With $N_{cells}^{DL}$ cells:<br>• If none of the conditions in the table cell above are satisfied | Sub-codebook 2 |

METHODS FOR DYNAMIC HARQ-ACK CODEBOOK WITH MULTIPLE SUB-CODEBOOKS

CROSS-REFERENCE TO RELATED APPLICATION(S)

The present application claims priority to and the benefit of U.S. Provisional Application No. 63/156,504, filed Mar. 4, 2021, entitled "HARQ CODEBOOK TYPE 2 ENHANCEMENT", and priority to and the benefit of U.S. Provisional Application No. 63/253,874, filed Oct. 8, 2021, entitled "DYNAMIC HARQ-ACK CODEBOOK WITH MULTI-SUBCODEBOOKS"; the entire contents of both of the provisional applications identified in this paragraph are incorporated herein by reference

FIELD

One or more aspects of embodiments according to the present disclosure relate to wireless communications, and more particularly to a system and method for handling acknowledgments in a wireless system.

BACKGROUND

In a wireless system, acknowledgment bits for received data may be sent as sets of bits referred to as codebooks. Each codebook may contain a plurality of bits each indicating whether a quantity of data, previously scheduled to be transmitted, by a respective scheduling communication, was successfully received. So that each such bit will have a predictable position in the codebook, in the presence of uncertainty regarding whether all of the scheduling communications were successfully received, the receiving device may pad the sets of acknowledgement bits, which may consume system resources.

It is with respect to this general technical environment that aspects of the present disclosure are related.

SUMMARY

According to an embodiment of the present disclosure, there is provided a method, including: receiving, by a User Equipment (UE), one or more first transmissions; decoding, by the UE, the first transmissions, to generate a first sub-codebook including one or more corresponding Hybrid Automatic Repeat Request Acknowledgement (HARQ ACK) bit strings each having a first length; receiving, by the UE, one or more second transmissions; decoding, by the UE, the second transmissions, to generate a second sub-codebook including one or more corresponding HARQ ACK bit strings each having a second length, greater than the first length; receiving, by the UE, one or more third transmissions; and decoding, by the UE, the third transmissions, to generate a third sub-codebook including one or more corresponding HARQ ACK bit strings each having a third length, greater than the second length.

In some embodiments, the first length is 1.

In some embodiments, each of the first length, the second length, and the third length is Radio Resource Control (RRC) configured.

In some embodiments, the generating of the third sub-codebook includes: receiving a code block group (CBG) having a number of code blocks that is greater than the second length and less than or equal to the third length; generating a set of HARQ ACK bits each corresponding to a respective one of the code block groups; and padding the set of HARQ ACK bits to form a HARQ ACK bit string having the third length.

In some embodiments, the generating of the second sub-codebook includes: receiving a code block group (CBG) having a number of code blocks that is greater than the first length and less than or equal to the second length; generating a set of HARQ ACK bits each corresponding to a respective one of the code block groups; and padding the set of HARQ ACK bits to form a HARQ ACK bit string having the second length.

In some embodiments, the method further includes: receiving a Count Downlink Assignment Indicator (C-DAI) for the second transmissions and a Total Downlink Assignment Indicator (T-DAI) for the second transmissions; determining, from the C-DAI and from the T-DAI, that a transmission, of the second transmissions, was missed; and including in the second sub-codebook a bit string, having the second length, of negative acknowledgement bits.

In some embodiments, the method further includes: receiving a C-DAI for the third transmissions and a T-DAI for the third transmissions, the C-DAI for the third transmissions being different from the C-DAI for the second transmissions, and the T-DAI for the third transmissions being different from the T-DAI for the second transmissions; determining, from the C-DAI for the third transmissions and from the T-DAI for the third transmissions, that a transmission, of the third transmissions, was missed; and including in the second sub-codebook a bit string, having the third length, of negative acknowledgement bits.

In some embodiments, the method further includes: receiving, with the C-DAI for the second transmissions and the T-DAI for the second transmissions, a T-DAI for the third transmissions; determining, from the C-DAI for the third transmissions and from the T-DAI for the third transmissions, that a transmission, of the third transmissions, was missed; and including in the second sub-codebook a bit string, having the third length, of negative acknowledgement bits.

In some embodiments, the method further includes: receiving, by the UE, one or more fourth transmissions; and decoding, by the UE, the fourth transmissions, to generate a fourth sub-codebook including one or more corresponding HARQ ACK bit strings each having a fourth length, greater than the third length.

According to an embodiment of the present disclosure, there is provided a User Equipment (UE), including: a radio; and a processing circuit, the processing circuit being configured to: receive one or more first transmissions; decode the first transmissions, to generate a first sub-codebook including one or more corresponding Hybrid Automatic Repeat Request Acknowledgement (HARQ ACK) bit strings each having a first length; receive one or more second transmissions; decode the second transmissions, to generate a second sub-codebook including one or more corresponding HARQ ACK bit strings each having a second length, greater than the first length; receive one or more third transmissions; and decode the third transmissions, to generate a third sub-codebook including one or more corresponding HARQ ACK bit strings each having a third length, greater than the second length.

In some embodiments, the first length is 1.

In some embodiments, each of the first length, the second length, and the third length is Radio Resource Control (RRC) configured.

In some embodiments, the generating of the third sub-codebook includes: receiving a code block group (CBG)

having a number of code blocks that is greater than the second length and less than or equal to the third length; generating a set of HARQ ACK bits each corresponding to a respective one of the code block groups; and padding the set of HARQ ACK bits to form a HARQ ACK bit string having the third length.

In some embodiments, the generating of the second sub-codebook includes: receiving a code block group (CBG) having a number of code blocks that is greater than the first length and less than or equal to the second length; generating a set of HARQ ACK bits each corresponding to a respective one of the code block groups; and padding the set of HARQ ACK bits to form a HARQ ACK bit string having the second length.

In some embodiments, the processing circuit is further configured to: receive a Count Downlink Assignment Indicator (C-DAI) for the second transmissions and a Total Downlink Assignment Indicator (T-DAI) for the second transmissions; determine, from the C-DAI and from the T-DAI, that a transmission, of the second transmissions, was missed; and include in the second sub-codebook a bit string, having the second length, of negative acknowledgement bits.

In some embodiments, the processing circuit is further configured to: receive a C-DAI for the third transmissions and a T-DAI for the third transmissions, the C-DAI for the third transmissions being different from the C-DAI for the second transmissions, and the T-DAI for the third transmissions being different from the T-DAI for the second transmissions; determine, from the C-DAI for the third transmissions and from the T-DAI for the third transmissions, that a transmission, of the third transmissions, was missed; and include in the second sub-codebook a bit string, having the third length, of negative acknowledgement bits.

In some embodiments, the processing circuit is further configured to: receive, with the C-DAI for the second transmissions and the T-DAI for the second transmissions, a T-DAI for the third transmissions; determine, from the C-DAI for the third transmissions and from the T-DAI for the third transmissions, that a transmission, of the third transmissions, was missed; and include in the second sub-codebook a bit string, having the third length, of negative acknowledgement bits.

In some embodiments, the processing circuit is further configured to: receive, by the UE, one or more fourth transmissions; and decode, by the UE, the fourth transmissions, to generate a fourth sub-codebook including one or more corresponding HARQ ACK bit strings each having a fourth length, greater than the third length.

According to an embodiment of the present disclosure, there is provided a User Equipment (UE), including: a radio; and means for processing, the means for processing being configured to: receive one or more first transmissions; decode the first transmissions, to generate a first sub-codebook including one or more corresponding Hybrid Automatic Repeat Request Acknowledgement (HARQ ACK) bit strings each having a first length; receive one or more second transmissions; decode the second transmissions, to generate a second sub-codebook including one or more corresponding HARQ ACK bit strings each having a second length, greater than the first length; receive one or more third transmissions; and decode the third transmissions, to generate a third sub-codebook including one or more corresponding HARQ ACK bit strings each having a third length, greater than the second length.

In some embodiments, the first length is 1.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for handling acknowledgments in a wireless system provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In Release 16 (Rel-16) of the Third Generation Partnership Project (3GPP) fifth generation New Radio (NR) standard (5G), a User Equipment (UE) has the ability to multiplex Hybrid Automatic Repeat Request acknowledgement (HARQ ACK) information on a Physical Uplink Shared Channel (PUSCH) when the uplink (UL) resources of the PUSCH and the Physical Uplink Control Channel(s) (PUCCH)(s) intended to deliver HARQ ACK information overlap. In this case, a UE can proceed with determining the HARQ codebook which is then used to convey the HARQ ACK information that is conveyed through the Uplink Control Information (UCI), multiplexed on the PUSCH. If the UE uses a Type-2 HARQ ACK codebook, the UE replies on the values of a Count Downlink Assignment Indicator (C-DAI) and a Total Downlink Assignment Indicator (T-DAI). The C-DAI and T-DAI are provided to the UE via the downlink (DL) scheduling Downlink Control Informations (DCIs) and UL scheduling DCIs, where these DCIs are used to schedule the PUCCHs and PUSCHs the resources of which are overlapped.

Release Rel-16 specifies a particular time order of those DL and UL DCIs which are involved in the UCI multiplexing scenario. In particular, the UE expects that the UL DCI scheduling the PUSCH where UCI multiplexing takes place is received in a Monitoring Occasion (MO) that is after all other DL DCIs that are scheduling PUCCHs with overlapping resources with the PUSCH. While the DL DCIs can carry values for the C-DAI and T-DAI counters, the UL DCI can also carry a value for the T-DAI (referred to as UL DAI and denoted $V_{DAI}^{UL}$) which is used by the UE as an indication of the total number of DCIs scheduled up to the last MO in the procedure.

In the 3GPP standard for New Radio (NR), a User Equipment (UE) is designed to receive different downlink (DL) signals from the base station (gNB). In NR, a UE receives DL transmissions to retrieve a variety of information from the gNB. For example, the UE receives user data from the gNB, such as the configuration of time and frequency resources known as the Physical Downlink Shared Channel (PDSCH). Specifically, the Media Access Control (MAC) layer provides user data which are intended to be delivered to the corresponding layer at the UE side. The Physical (PHY) layer of the UE takes the physical signal received on the PDSCH as input to the PDCSH processing chain, the output of which is fed as input to the MAC layer. Similarly, the UE receives control data from the gNB in what is referred to as the Physical Downlink Control Channel (PDCCH). The control data is referred to as the Downlink Control Information (DCI) and is converted into the PDCCH signal through a PDCCH processing chain on the gNB side. Conversely, a UE sends uplink (UL) signals to convey user data or control information, respectively referred to as Physical Uplink Shared Channel (PUSCH) and Physical Uplink Control Channel (PUCCH). Specifically, the PUSCH is used by the UE MAC layer to deliver data to the gNB. In addition, the PUCCH is used to convey control data referred to as the Uplink Control Information (UCI), which is converted to the PUCCH signal through a PUCCH processing chain at the UE side.

For the PDSCH channel, Rel-16 of the NR standard allows the use of Code Blocks (CBs) and Code Block Groups (CBGs). The use of CBs helps to reduce the processing complexity of the PDSCH, and the use of CBGs helps to reduce the Hybrid Automatic Repeat Request (HARQ) feedback overhead by grouping the CBs of a Transport Block (TB) into a maximum number N of CBGs per TB, where the value of N is configured per cell. Specifically, the procedure of transmitting and receiving a PDSCH signal on an active cell is as follows.

On the transmitter side (gNB):

1. The gNB makes a decision to schedule a PDSCH transmission to the UE. The transmission occurs over a particular allocation of resources and with a particular PDSCH configuration. Based on the PDSCH allocation, the gNB determines the TB Size (TBS).

2. An amount of data equal to TBS is then allocated as the TB to be transmitted in the PDSCH. The TB is amended with a Cyclic Redundancy Check (CRC).

3. The gNB then divides the combination of the TB and the CRC into smaller chunks of data, referred to as CBs, where the size of each CB is based on the used Low-Density-Parity-Check (LDPC) code. The collection of CBs is virtually grouped into a number N of non-overlapping sets of CBs called CBGs.

4. Each CB is amended with an additional CRC, and the combination of the CB and the CRC is coded using the determined LDPC code.

5. The coded outputs of all CBs are rate-matched on the available resources for PDSCH transmission.

On the receiver side (UE):

1. The UE extracts the received coded output for all CBs included in the PDSCH.

2. The UE then attempts to decode each CB individually.

3. For each CBG, if any CB inside the CBG fails its respective CRC check, then a HARQ Negative Acknowledgement (NACK) is prepared for feedback transmission by the UE. Otherwise, a HARQ Acknowledgement (ACK) is prepared.

4. The UE then conveys the set of HARQ ACK/NACK bits in a UCI transmitted in the PUCCH signal corresponding to the PDSCH.

In Rel-16, the UE is Radio Resource Control (RRC) configured with a maximum number of CBGs per TB $N_{HARQ-ACK}^{CBG/TB,max}$ per cell. For a given TB, the set of C CBs are then grouped into M CBGs where M is at most equal to the maximum number of CBGs per TB per cell. With respect to the transmission of a PUCCH containing the HARQ feedback, the UE is provided with a timing value which indicates a value k (in terms of slots) such that the PUCCH transmission happens in slot n+k, where n is the slot where the PDSCH reception ends. This value k can be either RRC configured, or dynamically provided by the scheduling DCI through the field PDSCH-to-HARQ_feedback. The field PDSCH-to-HARQ_feedback can assume any value from the set {1,2,3,4,5,6,7,8}. Alternatively, the value of the field can map to a set of eight values that are RRC-configured.

For a given slot n in which a UCI is scheduled to be transmitted by the UE on a PUCCH or a PUSCH, multiple candidate locations for PDCCH receptions can have corresponding HARQ feedback transmissions in the given slot; the candidate locations are referred to as Monitoring Occasions (MOs). The set of MOs correspond to all possible MOs which could have had a HARQ ACK information scheduled in slot n. Counting the number of possible MOs can include 1) counting all slots in which DCIs schedule PDSCHs with corresponding PUCCHs falling in slot n, and 2) accounting for the necessary processing time of the PUCCH; for example, a slot with a potential DCI scheduling a PDSCH with a corresponding PUCCH in slot n which does not allow enough time for the UE to process the PUCCH may not be counted as an MO in the set of MOs. When preparing the UCI to be conveyed in the PUCCH or the PUSCH, the UE accounts for all HARQ information bits corresponding to these MOs. The UE prepares the HARQ feedback in a HARQ codebook, which is then mapped onto the UCI.

In Rel-16, there are two mechanisms for determining the HARQ codebook, Type I and Type II (which may also be referred to as "Type 1" and "Type 2"). In a Type I HARQ codebook (which is semi-static), the UE assigns HARQ feedback bits for all possible PDSCH instances the HARQ feedback of which could be within slot n, including all MOs and active cells, irrespective of whether they are actually transmitted. In a Type II HARQ codebook (which is dynamic), the UE assigns HARQ feedback bits for the MOs and active cells in which a PDSCH is actually transmitted.

The procedure for Type II HARQ codebook determination relies on the values of two counters that may be indicated in the DL DCIs received in the MOs in the set of MOs. Those two counters are referred to as the Count Downlink Assignment Indicator (C-DAI) and the Total Downlink Assignment Indicator (T-DAI). The value of C-DAI indicated in a DL DCI received in one MO m and a given serving cell c in the set of MOs is used to indicate the incremented total number of DL DCIs transmitted by the gNB until the transmission of this MO m and the serving cell c. The value of the C-DAI is represented as $V_{C\text{-}DAI,c,m}^{DL}$.

The value of T-DAI indicated in a DL DCI received in one MO in the set of MOs is used to indicate the total number of DL DCIs transmitted by the gNB across all serving cells up until this MO m. The value of the T-DAI is represented as $V_{T-DAI,m}^{DL}$.

Figure 1A:
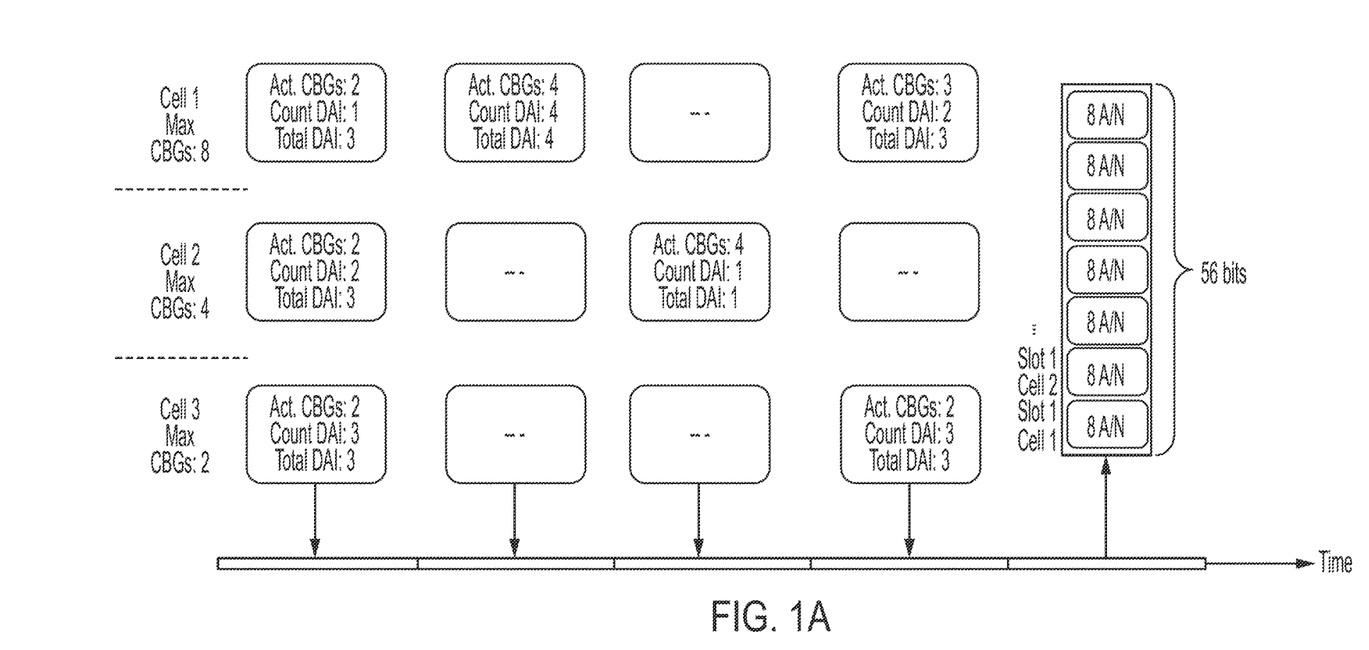
FIG. 1A is a data flow diagram, according to an embodiment of the present disclosure.

For a Type II HARQ codebook, an example of the HARQ codebook determination mechanism based on Rel-16 is shown in FIG. 1A, which shows a scenario with three serving cells configured with particular values of the maximum number of CBGs per TB $N_{HARQ-ACK}^{CBG/TB,max}$. Rel-16 based HARQ codebook determination is based on the count DAI and total DAI being incremented based on the number of transmitted TBs. In the scenario shown, the resultant HARQ codebook consists of 56 bits, which is significantly greater than the 19 acknowledgment/negative acknowledgment (ACK/NACK) feedback bits needed to provide feedback for the 19 transmitted CBGs.

The procedure for determining a Type II HARQ codebook in Rel-16 is described in Section 9.1.3.1 of Technical Specification 38.213 of Rel-16.

When the UCI is multiplexed on a PUSCH, the scheduling UL DCI can also carry a T-DAI value (referred to as UL DAI and represented by $V_{DAI}^{UL}$) which is used by the UE in the HARQ codebook determination procedure. The procedure replaces the T-DAI value indicated by the DL DCI with the UL DAI value as described in Section 9.1.3.2 of Technical Specification 38.213 of Rel-16. In Rel-16, the UE interprets the value of C-DAI and T-DAI in a DL DCI according to Table 9.1.3-1 and Table 9.1.3-1A of Technical Specification 38.213 of Rel-16, and the UE interprets the value of UL DAI according to Table 9.1.3-2 of Technical Specification 38.213 of Rel-16.

However, there is an exception for the case of a UL DAI. Namely, when $V_{DAI}^{UL}=4$ the UE interprets this indication to mean (i) that the total number of DCIs=4 if the UE receives at least one PDCCH carrying DL DCI up until the last MO or it has Semi-Persistent Scheduling (SPS) ACK/NACK bits, and (ii) that the total number of DCIs=0 if the UE does not receive any PDCCH carrying DL DCIs up until the last MO and does not have any ACK/NACK bits corresponding to an SPS PDSCH reception. With such behavior, the following two situations are indistinguishable from a UE point of view: if the UE does not receive any PDCCH and is indicated $V_{DAI}^{UL}=4$, then (i) the UE may have missed all scheduled DCIs, in which case the UE should have indicated 4 NACKs for Dynamic Grant DG PDSCHs in addition to SPS ACK/NACK bits, if any, or (ii) there may have not been any scheduled DCIs, in which case the UE should not send any HARQ feedback bits for those DCIs, for DG PDSCHs in addition to SPS A/N bits, if any. This interpretation (by the UE) of $V_{DAI}^{UL}=4$ assumes situation (ii), which may cause an error if the actual scheduling resembles situation (i). However, situation (i) may be less likely than situation (ii).

As mentioned above, in Rel-15, for a given PDSCH reception either 1 or $N_{HARQ-ACK,max}^{CBG/TB,max}$ bits are generated by the UE for a detected Dynamic Grant (DG) PDSCH or a missed PDCCH scheduling a DG PDSCH, where $$N_{HARQ-ACK,max}^{CBG/TB,max} = \max_c N_{TB,c}^{DL} \cdot N_{HARQ-ACK,c}^{CBG/TB,max}.$$

Figure 1B:
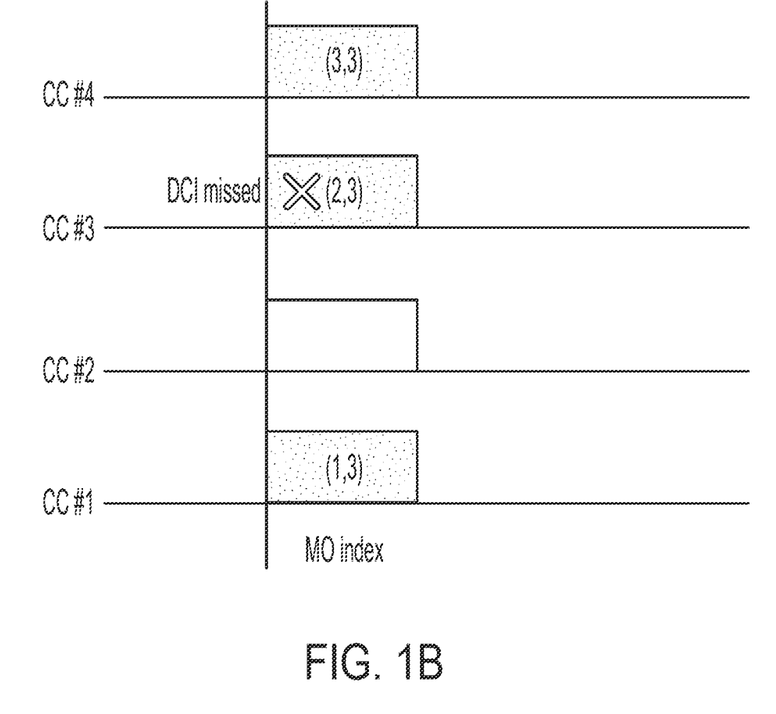
FIG. 1B is a data flow diagram, according to an embodiment of the present disclosure.

In the above, $N_{TB,c}^{DL}$ denotes the maximum number of codewords for a serving cell c, which is indicated by radio resource control (RRC) information element (IE) maxNrofCodeWordsScheduledByDCI, and $N_{HARQ-ACK,c}^{CBG/TB,max}$ indicates the number of HARQ-ACK bits per codeword or transport block (TB) for serving cell c which is given by RRC IE maxCodeBlockGroupsPerTransportBlock. The reason for generating a fixed number $N_{HARQ-ACK,max}^{CBG/TB,max}$ of bits for a detected or missed PDCCH is that UE may not be aware of how many CBGs have been scheduled in the missing DCIs. Referring to FIG. 1B and assuming, for purposes of illustration, that (i) the UE is configured with four serving cells, that (ii) the maximum number of codewords is equal to one for every cell, and that (iii) the maximum number of CBGs that can be received are 2, 3, 4 and 5 for Component Carrier (CC) #1 to CC #4, if the UE misses the DCI on CC #3, and detects the other two DCIs, it will know it has missed one DCI from the indicated DAI values. However, it cannot know which cell the missing DCI was transmitted on. If the missing DCI was sent on CC #2, UE should include 3 NACK bits, while if it was sent on CC #3 it should include 4 NACK bits. To avoid any mismatch between UE and gNB on the number of included NACK bits, the UE may simply include a maximum number of possible CBGs across all cells for every detected or missed PDCCH. Considering the number of codewords for each cell, it generates $N_{HARQ-ACK,max}^{CBG/TB,max}$ ACK/NACK bits for each scheduling DCI. If the actual number of scheduled CBGs is less than this maximum number, the UE appends zeros.

Figure 1C:
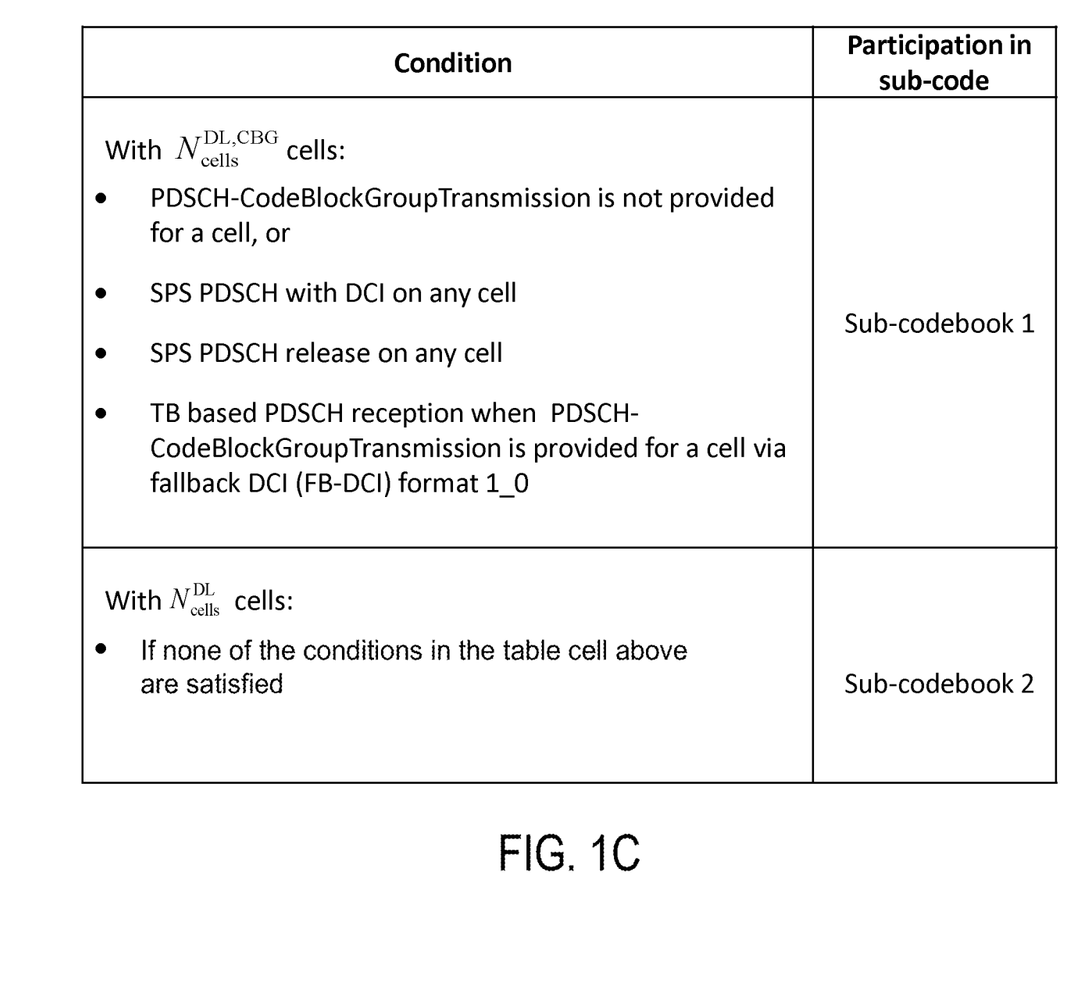
FIG. 1C is a table for sub-codebook participation, according to an embodiment of the present disclosure.

Although including $N_{HARQ-ACK,max}^{CBG/TB,max}$ bits for every PDSCH may resolve the payload size mismatch issue, it may become inefficient due to adding extra zero-padding. The inefficiency becomes more severe when the maximum number of CBGs configured on different cells varies significantly. As an example, if 2 cells are configured with only one CBG (or a TB-based transmission), and another two cells are configured with eight CBGs, every ACK/NACK bit of the first two cells will have appended to it seven zero bits, which can significantly increase the payload size and have, in turn, a negative impact on the PUCCH reliability. To mitigate the issue of zero-appending, Rel-15 employs two sub-codebooks, as shown in the table of FIG. 1C, of which the first sub-codebook (Sub-codebook 1) includes all the 1-bit HARQ-ACK bit strings (e.g., concatenated together) and the second sub-codebook (Sub-codebook 2) includes all the $N_{HARQ-ACK,max}^{CBG/TB,max}$-bit HARQ-ACK bit strings (e.g., concatenated together). For example, if the UE is provided PDSCH-CodeBlockGroupTransmission for $N_{cells}^{DL,CBG}$ serving cells, it may use Sub-codebook 2 for those serving cells, and if the UE is not provided PDSCH-CodeBlockGroupTransmission for $N_{cell}^{DL,TB}$ serving cells it may use Sub-codebook 1 for those serving cells (where $N_{cells}^{DL,TB}+N_{cells}^{DL,CBG}=N_{cells}^{DL}$).

Figure 1D:
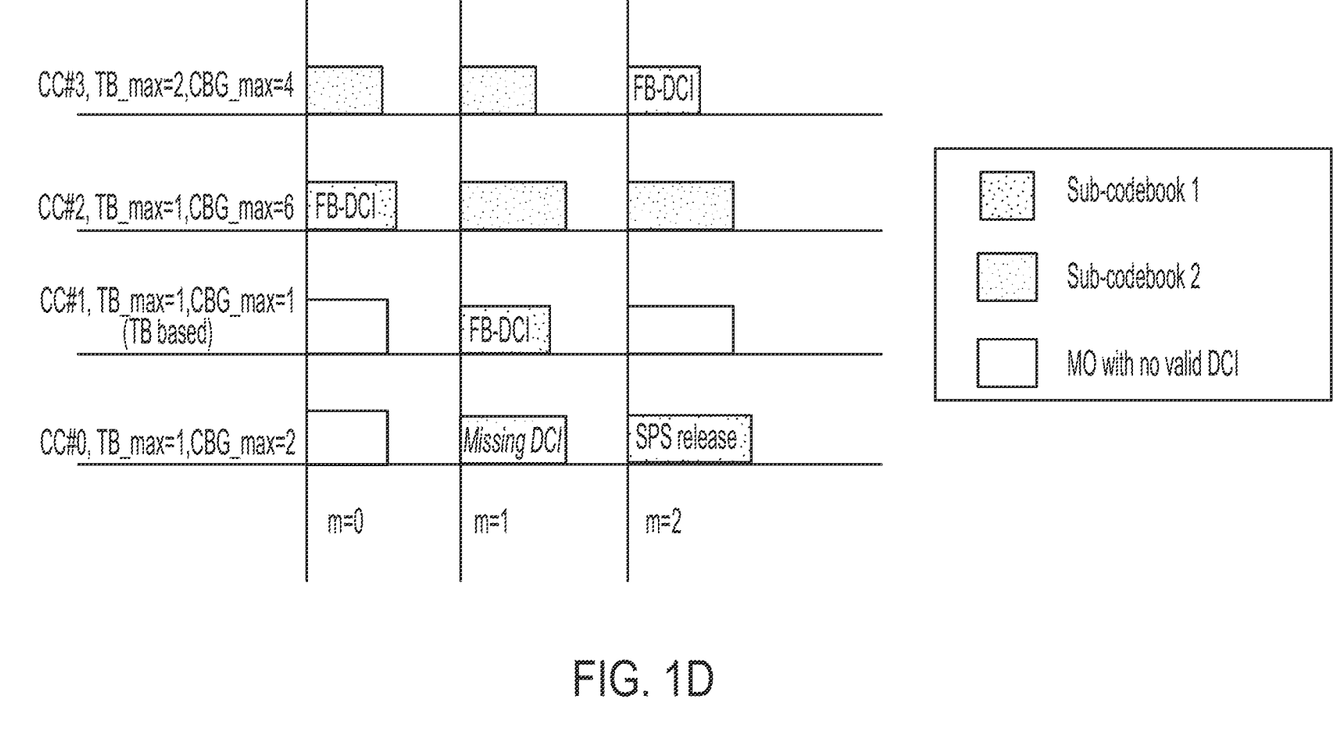
FIG. 1D is a data flow diagram, according to an embodiment of the present disclosure.

FIG. 1D shows an example of a Type-2 HARQ codebook in Rel-15. There are four MOs which participate in sub-codebook 1 and seven MOs which participate in sub-codebook 2. Four HARQ-ACK bits are generated by the UE for the four MOs as ($a_1$, $a_2$, $a_3$, $a_4$) corresponding to the ordered pairs (formatted as (m=MO index, c=serving cell index)) (0,2), (1,1), (2,0) and (2,3) respectively. For the rest of the MOs, 8 bits are generated resulting in the ACK/NACK bit strings ($b_1$, $b_2$, $b_3$, $b_4$, $b_5$) where each bit string $b_i$ is 8 bits long. All 4 cells participate in the first sub codebook while only CC #0, CC #2 and CC #3 participate in the second sub-codebook. In FIG. 1D, $$TB\_max = \max_c N_{TB,c}^{DL} \text{ and } CBG\_max = N_{HARQ-ACK,c}^{CBG/TB,max}.$$

As mentioned above, if the maximum number of CBGs configured per serving cell varies significantly among the serving cells, having a fixed HARQ-ACK bit width per serving cell may generate a large overhead for the payload size, as the UE may need to append a significant number of zero bits. As an example, if all of the serving cells but one are configured with a maximum $N_{HARQ-ACK,c}^{CBG/TB,max}=1$ CBG and the one serving cell is configured with $N_{HARQ-ACK,c}^{CBG/TB,max}=8$ CBGs, the UE may generate 8 bits for all the MOs and serving cells, including a large number of padding bits. To address this issue, two sub-codebooks are employed in Rel-15 where 1 or $N_{HARQ-ACK,max}^{CBG/TB,max}$ bits are generated for the first and second sub-codebook, respectively. The sub-codes are determined by the UE according to the table of FIG. 1C.

In some embodiments, ACK/NACK bits may be reported more efficiently, using N sub-codebooks. Each DCI scheduling a DG PDSCH, or indicating an SPS release PDCCH, indicating secondary cell (Scell) dormancy, or otherwise requiring only one ACK/NACK bit for HARQ feedback, may be mapped to one of the sub-codebooks. The mapping can be done with one or a combination of the following methods: (i) RRC configuration determining the maximum number of CBGs per serving cell, (ii) search space set configuration (iii) Control Resource Set (CORESET) configuration (iv) detected DCI format (v) DCIs indicating SPS release or Scell dormancy or any DCI which doesn't schedule a PDSCH when the UE is configured to report a HARQ_ACK bit for the PDCCH carrying the DCI, being mapped to the first sub-codebook and (vi) SPS PDSCHs being mapped to the first sub-codebook.

Codebook construction may proceed as follows. The UE may be configured via RRC with N sub-codebooks; namely sub-codebook 0, sub-codebook 1, . . . , sub-codebook N-1, and with corresponding maximum number of A/N bits $L_0$, $L_1$, . . . , $L_{N-1}$. UE constructs the CB as follows, if a UE is provided PDSCH-CodeBlockGroupTransmission for $N_{cells}^{DL,CBG}$ serving cells; and is not provided PDSCH-CodeBlockGroupTransmission, for $N_{cells}^{DL,TB}$ serving cells (where $N_{cells}^{DL,TB}+N_{cells}^{DL,CBG}=N_{cells}^{DL}$).

Sub-codebook 0 may be constructed for $N_{cells}^{DL}$ for (i) SPS PDSCH release PDCCH, (ii) SPS PDSCH reception, (iii) any DCI format indicating Scell dormancy, (iv) any TB-based PDSCH reception on the $N_{cells}^{DL,CBG}$ or any PDSCH reception on the $N_{cells}^{DL,TB}$ cells, or (v) any DCI format conveying unicast control information for the UE without scheduling a PDSCH. For each of the categories (i) through (v) above, the UE generates $L_0$ ACK/NACK bits.

For sub-codebook $n \in \{1, \ldots, N-1\}$, (i) $N_{cells}^{DL}$ is replaced by $N_{cells}^{DL,CBG,i}$ where $N_{cells}^{DL,CBG,i}$ is the number of cells among cells which are configured with the maximum number of CBGs $N_{HARQ-ACK,max}^{CBG/TB,max}$ such that $L_{n-1} < N_{HARQ-ACK,max}^{CBG/TB,max} \leq L_n$, and (ii) the UE generates a bit string including (e.g., consisting of) $L_n$ ACK/NACK bits for each DG PDSCH in the sub-codebook, by padding (e.g., with zero bits) the ACK/NACK bits of the scheduled PDSCH. As used herein, "padding" a set of m bits to form a bit string of length n means (i) adding n-m padding bits to the set of m bits if m is less than n, or (ii) adding no padding bits (i.e., leaving the set of m bits unchanged) if m equals n.

The C-DAI and T-DAI values are counted separately for each sub-codebook. For sub-codebook 0, the ACK/NACK bits for the SPS PDSCHs are appended to the other ACK/NACK bits. The UE generates the final CB payload by appending the ACK/NACK bits of the sub-codebooks to each other starting from sub-codebook 0. In some embodiments, $L_0=1$, which means only 1 ACK/NACK bit is generated for the PDSCHs and PDCCHs.

Figure 2A:
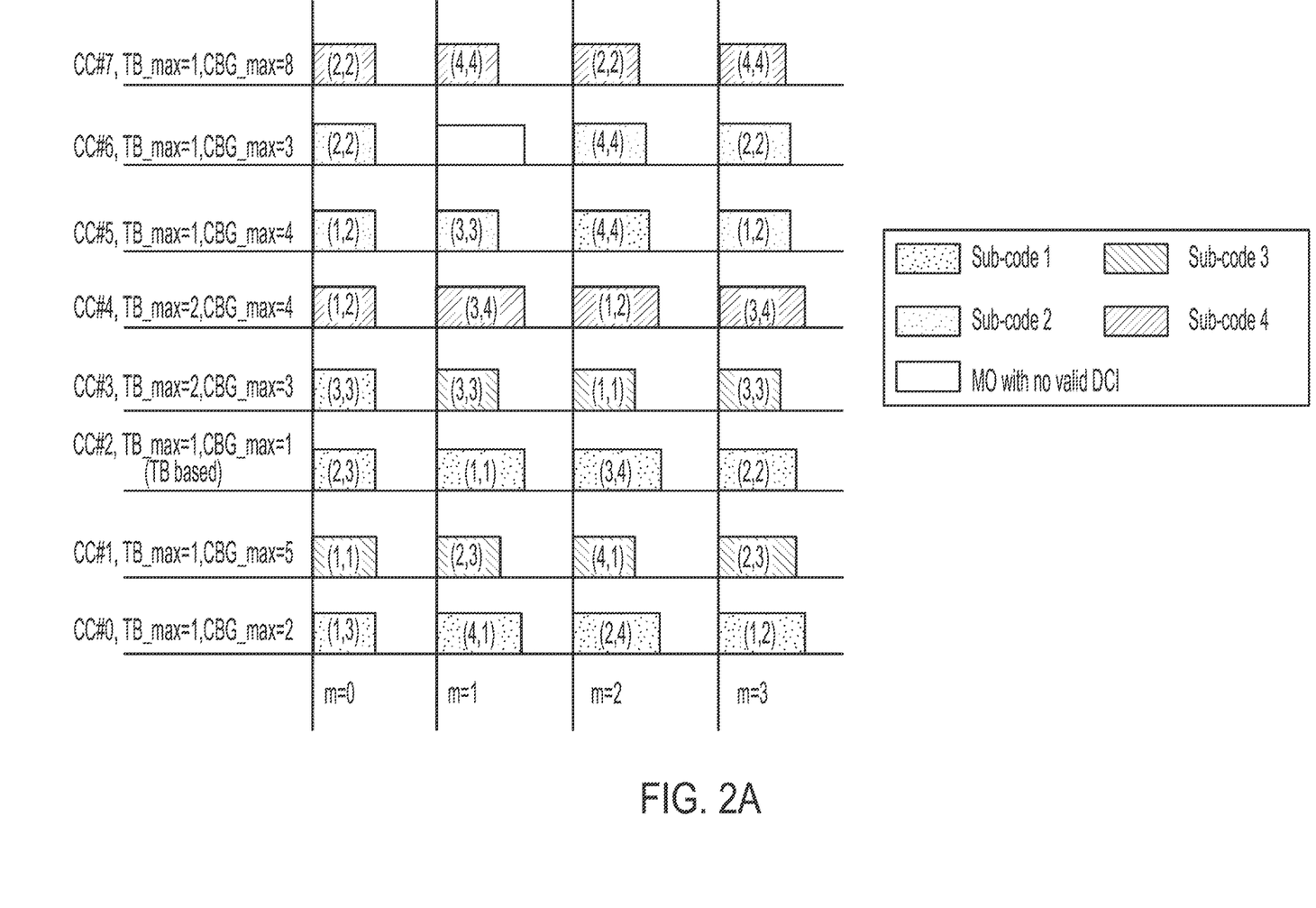
FIG. 2A is a data flow diagram, according to an embodiment of the present disclosure.

FIG. 2A depicts an example of a 4-sub-codebook, i.e. N=4, dynamic HARQ-ACK codebook. The sub-codebooks are determined either by the RRC parameters determining the maximum number of codewords per serving cell and maximum number of CBGs per serving cell, or based on the DCI formats, etc. FIG. 2A corresponds to a configuration with four sub-codebooks, $(L_0, L_1, L_2, L_3)=(2,4,6,8)$. With this configuration, a DCI for a cell for which the quantity $N_{HARQ-ACK,max}^{CBG/TB,max}$ is smaller or equal to 2 as well as all DCIs scheduling a TB-based PDSCH, SPS release PDCCH, Scell dormancy etc. are mapped to sub-codebook 1. A DCI for a cell for which the quantity is greater than 2 and less than or equal to 4 is mapped to sub-codebook 2. A DCI for a cell for which the quantity is greater than 4 and less than or equal to 6 is mapped to sub-codebook 3, and a DCI for a cell for which the quantity is greater than 6 and less than or equal to 8 is mapped to sub-codebook 4. The mapping is not only based on the value of $N_{HARQ-ACK,max}^{CBG/TB,max}$; it is also based on the DCI format and the type of information carried by the DCI. In particular on cells CC #3 and CC #5 a DCI format which only scheduled a TB-based PDSCH (or SPS release) has been detected, which are mapped to sub-codebook 1.

A significant payload size reduction is possible in some embodiments. An appropriately designed m-sub-code HARQ-ACK codebook ensures that the payload size is reduced as the number of sub-codebooks m is increased. As a comparison to a HARQ-codebook with only one sub-codebook, in case of the scheduling depicted in FIG. 2A, a 1-sub-codebook HARQ-ACK codebook generates 31×8=248 bits, while a 4-sub-codebook HARQ-ACK codebook generates 10×2+6×4+7×6+8×8=150 bits, which results in a reduction in the payload size of about 40%.

In general, the reliability of a method employing each sub-codebooks may be related to the bitwidth of the DAI field and the number of scheduled PDSCHs whose HARQ-ACK bits are to be multiplexed in one slot. Roughly speaking, if the scheduling conditions of every sub-codebook are such that the total number of scheduled PDSCHs or PDCCHs for the sub-codebook are too small, then missing all DCI will cause HARQ_ACK payload size mismatch regardless of the bitwidth. However, in a heavy CA framework with a large number of scheduled PDSCHs within each sub-codebook, increasing the bitwidth of the DAI field can increase the reliability of sub-codebooks. However, even with an increased bitwidth, if the number of PDCCHs are too large, the likelihood of missing a certain number of them in a row increases, therefore gNB should ensure that the number of PDCCHs within each sub-codebook is not too large. Such a condition can be ensured by the gNB via configuring the UE with a sufficiently large number of sub-codebooks.

In some embodiments, the network may transmit additional DAI fields in a DCI, which may improve reliability. In the basic form of the multi-subcodebook CB, a DCI only provides C-DAI and T-DAI for the indicated sub-codebook. That is, there is only one DAI field in the DCI regardless of the configured number of sub-codebooks. With this form, there may be no protection across the sub-codebooks. As mentioned above, the reliability of each sub-codebook may decrease, especially when the number of scheduled PDSCHs is small. To mitigate the reliability issue, the gNB may configure additional DAI fields in the DCI to provide protection for the other non-scheduled sub-codebooks. For example, the gNB may set the DAI values of the other sub-codebooks to be equal to the latest DAI values corresponding to the sub-codebook. In general, either of the following two options may be implemented.

In the first option, with N sub-codebooks, the DCI includes N different DAI fields. The DAI for the scheduled sub-codebook is incremented from the latest PDCCH participating in the sub-codebook according to the MO and the serving cell index in the Type-2 HARQ-ACK CB pseudo-code. Each DAI value for a non-scheduled sub-codebook equals the latest DAI value corresponding to the sub-codebook, according to the MO and cell index.

In the second option, with N sub-codebooks, the DCI includes two DAI fields. One field is associated with the scheduled sub-codebook i, while the other one is associated with another sub-codebook j, where j is a function of i where the function may be (i) configured to the UE via RRC, or (ii) a specific fixed formula. In a more general way, the DCI may include M<N fields where one DAI corresponds to the scheduled sub-codebook, while the other M−1 fields are associated with certain non-scheduled sub-codebooks where the association is given by a specific rule such as RRC configuration or a fixed formula.

In some embodiments, the pseudo-code of the Type-2 HARQ-ACK CB (included in Section 9.1.3.1 of Technical Specification 38.213 of Rel-16) may be modified to accommodate the sending of an additional DAI. In one approach, only the T-DAI corresponding to the last MO index of the non-scheduled sub-codebook may be included in the DCI, which is used by the UE to override the latest T-DAI directly indicated by DCI for the sub-codebook.

Figure 2B:
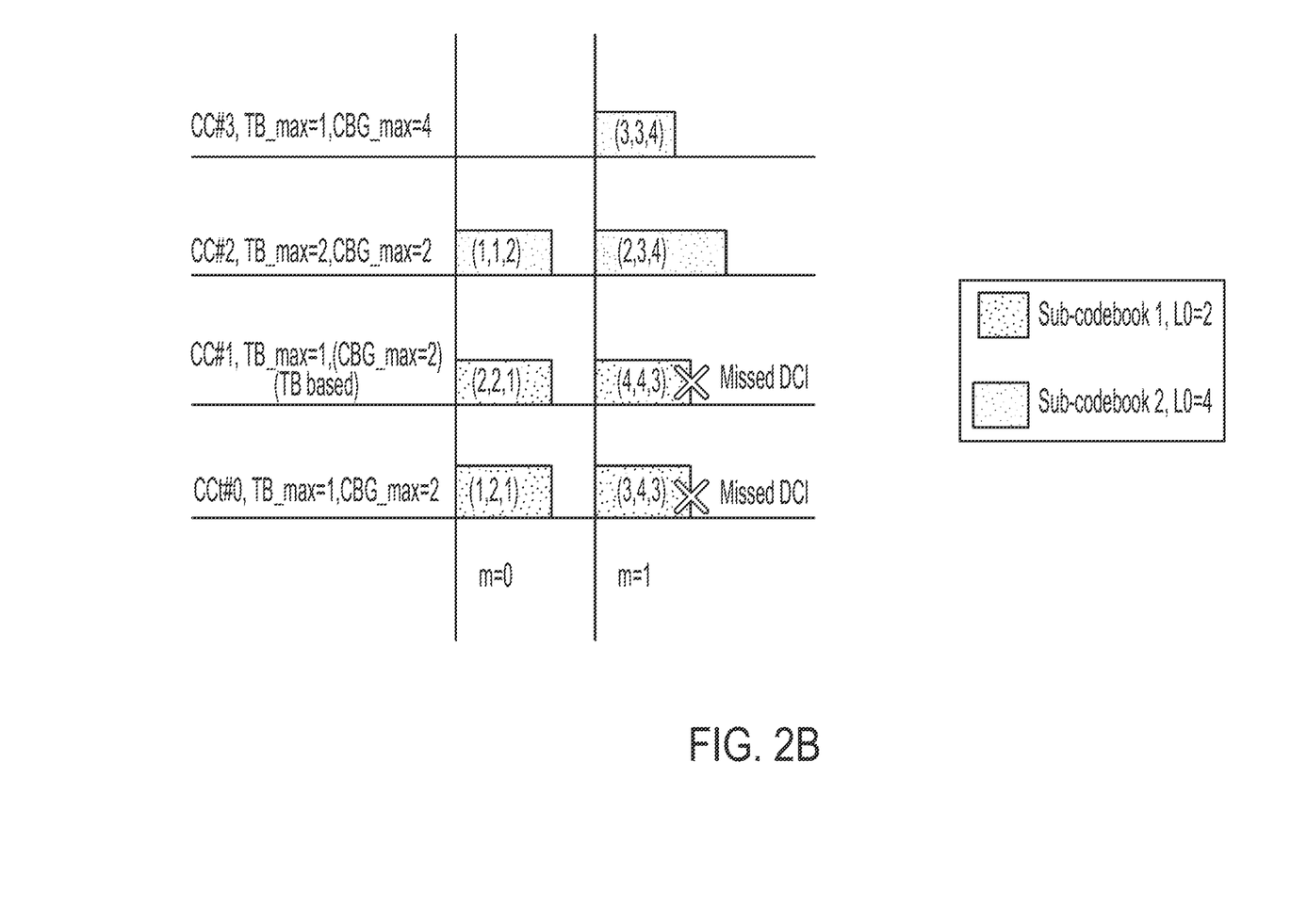
FIG. 2B is a data flow diagram, according to an embodiment of the present disclosure.

FIG. 2B shows an example on how including an additional T-DAI may help the UE determine the correct payload size. As can be seen, when the additional T-DAI is not included, if the UE misses both DCIs of the first sub-codebook, the payload size for the first sub-codebook is incorrect. The gNB may however be configured to include the additional T-DAI in the scheduling DCI of a sub-codebook, such that, at any MO, the value of the additional T-DAI (the third element of each three-tuple illustrated in FIG. 2B) indicates the values of T-DAI of another sub-codebook. With the other T-DAI being included, if the UE misses the two DCIs of the first sub-codebook in the last MO, it can determine the correct payload size of the first sub-codebook, as long as it detects at least one of the two DCIs of the second sub-codebook in the last MO, because each of these contains the value of T-DAI for the first sub-codebook (i.e., the value 4) as the last element of the three-tuple.

Figure 3:
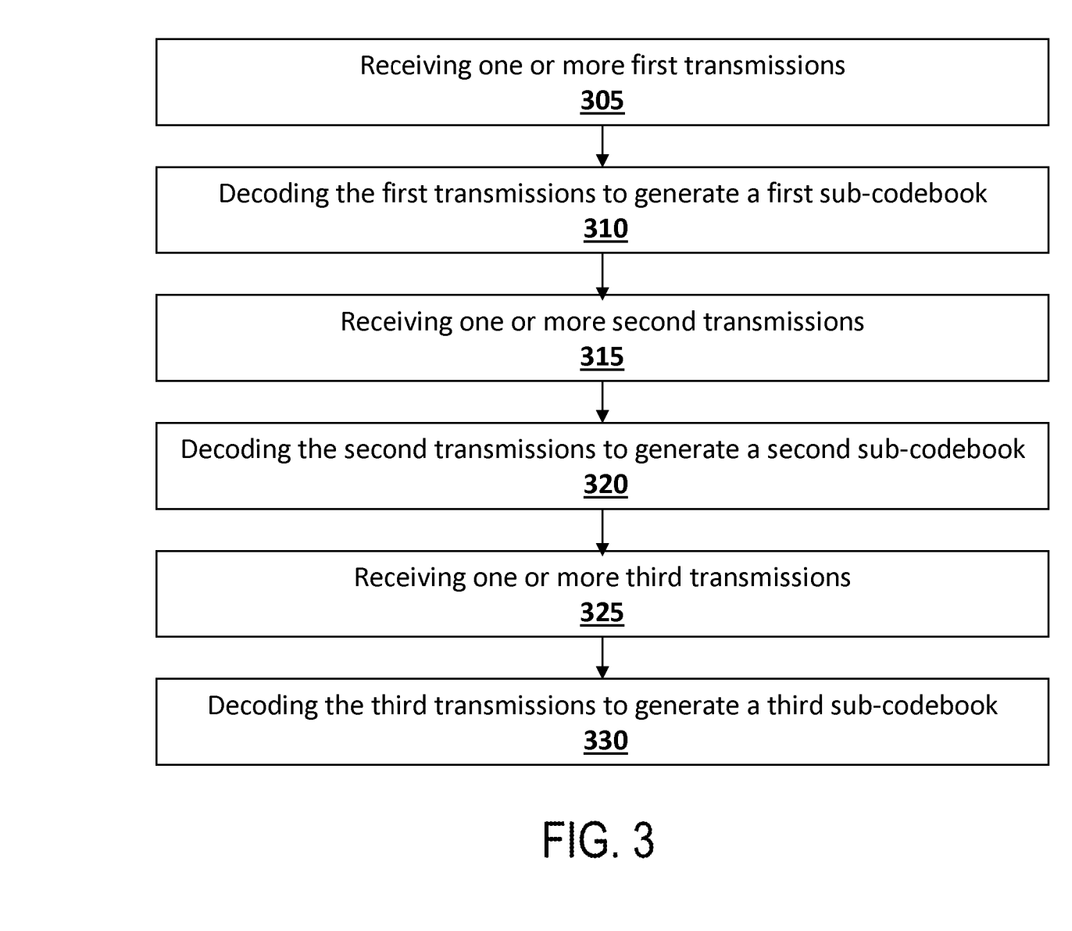
FIG. 3 is a flowchart, according to an embodiment of the present disclosure.
Figure 4:
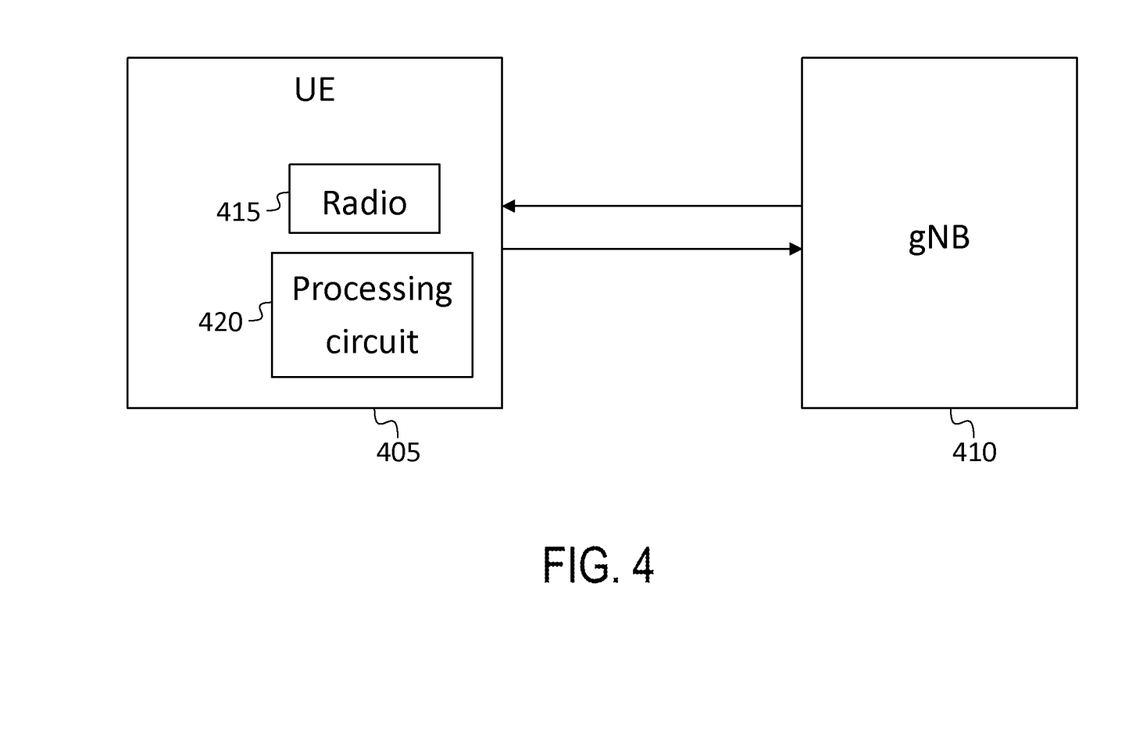
FIG. 4 is a block diagram, according to an embodiment of the present disclosure.

FIG. 3 shows a flowchart of a method. In some embodiments, at 305, a UE receives one or more first transmissions; at 310, the UE decodes the first transmissions, to generate a first sub-codebook comprising one or more corresponding Hybrid Automatic Repeat Request Acknowledgement (HARQ ACK) bit strings each having a first length; at 315, the UE receives one or more second transmissions; at 320, the UE decodes the second transmissions, to generate a second sub-codebook comprising one or more corresponding HARQ ACK bit strings each having a second length; at 325, the UE receives one or more third transmissions; and at 330, the UE decodes the third transmissions, to generate a third sub-codebook comprising one or more corresponding HARQ ACK bit strings each having a third length. The receiving of the first, second and third transmissions is drawn, in FIG. 3, for ease of illustration, as occurring in order; in general, however, the transmissions may be received in any order, with, e.g., some of the third transmissions being received after some of the first transmissions and after some of the first transmissions. FIG. 4 shows a system including a UE 405 and a gNB 410, in communication with each other. The UE may include a radio 415 and a processing circuit (or a means for processing) 420, which may perform various methods disclosed herein, e.g., the method illustrated in FIG. 3. For example, the processing circuit 420 may receive, via the radio 415, transmissions from the network node (gNB) 410, and the processing circuit 420 may transmit, via the radio 415, signals to the gNB 410.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The terms "processing circuit" and "means for processing" are used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of a system and method for handling acknowledgments in a wireless system have been specifically described and illustrated herein, many modifications and variations will be apparent to those skilled in the art. Accordingly, it is to be understood that a system and method for handling acknowledgments in a wireless system constructed according to principles of this disclosure may be embodied other than as specifically described herein. The invention is also defined in the following claims, and equivalents thereof.

What is claimed is:

1. A method, comprising:
   receiving, by a User Equipment (UE), one or more first transmissions;
   decoding, by the UE, the first transmissions, to generate a first sub-codebook comprising one or more corresponding Hybrid Automatic Repeat Request Acknowledgement (HARQ ACK) bit strings, wherein each of the one or more corresponding HARQ ACK bit strings of the first sub-codebook has a first length based on a first maximum number of code block groups (CBGs) per transport block (TB);
   receiving, by the UE, one or more second transmissions;
   decoding, by the UE, the second transmissions, to generate a second sub-codebook comprising one or more corresponding HARQ ACK bit strings, wherein each of the one or more corresponding HARQ ACK bit strings of the second sub-codebook has a second length based on a second maximum number of CBGs per TB, greater than the first length;
   receiving, by the UE, one or more third transmissions; and
   decoding, by the UE, the third transmissions, to generate a third sub-codebook comprising one or more corresponding HARQ ACK bit strings, wherein each of the one or more corresponding HARQ ACK bit strings of the third sub-codebook has a third length based on a third maximum number of CBGs per TB, greater than the second length.

2. The method of claim 1, wherein the first length is 1.

3. The method of claim 1, wherein each of the first length, the second length, and the third length is Radio Resource Control (RRC) configured.

4. The method of claim 1, wherein the generating of the third sub-codebook comprises:
   receiving a code block group (CBG) having a number of code blocks that is greater than the second length and less than or equal to the third length;
   generating a set of HARQ ACK bits each corresponding to a respective one of the code block groups; and
   padding the set of HARQ ACK bits to form a HARQ ACK bit string having the third length.

5. The method of claim 1, wherein the generating of the second sub-codebook comprises:
   receiving a code block group (CBG) having a number of code blocks that is greater than the first length and less than or equal to the second length;
   generating a set of HARQ ACK bits each corresponding to a respective one of the code block groups; and
   padding the set of HARQ ACK bits to form a HARQ ACK bit string having the second length.

6. The method of claim 1, further comprising:
   receiving a Count Downlink Assignment Indicator (C-DAI) for the second transmissions and a Total Downlink Assignment Indicator (T-DAI) for the second transmissions;
   determining, from the C-DAI and from the T-DAI, that a transmission, of the second transmissions, was missed; and
   including in the second sub-codebook a bit string, having the second length, of negative acknowledgement bits.

7. The method of claim 6, further comprising:
   receiving a C-DAI for the third transmissions and a T-DAI for the third transmissions, the C-DAI for the third transmissions being different from the C-DAI for the second transmissions, and the T-DAI for the third transmissions being different from the T-DAI for the second transmissions;
   determining, from the C-DAI for the third transmissions and from the T-DAI for the third transmissions, that a transmission, of the third transmissions, was missed; and
   including in the second sub-codebook a bit string, having the third length, of negative acknowledgement bits.

8. The method of claim 6, further comprising:
   receiving, with the C-DAI for the second transmissions and the T-DAI for the second transmissions, a T-DAI for the third transmissions;
   determining, from the C-DAI for the third transmissions and from the T-DAI for the third transmissions, that a transmission, of the third transmissions, was missed; and
   including in the second sub-codebook a bit string, having the third length, of negative acknowledgement bits.

9. The method of claim 1, further comprising:
   receiving, by the UE, one or more fourth transmissions; and
   decoding, by the UE, the fourth transmissions, to generate a fourth sub-codebook comprising one or more corresponding HARQ ACK bit strings each having a fourth length, greater than the third length.

10. A User Equipment (UE), comprising:
a radio; and
a processing circuit,
the processing circuit being configured to:
  receive one or more first transmissions;
  decode the first transmissions, to generate a first sub-codebook comprising one or more corresponding Hybrid Automatic Repeat Request Acknowledgement (HARQ ACK) bit strings, wherein each of the one or more corresponding HARQ ACK bit strings of the first sub-codebook has a first length based on a first maximum number of code block groups (CBGs) per transport block (TB);
  receive one or more second transmissions;
  decode the second transmissions, to generate a second sub-codebook comprising one or more corresponding HARQ ACK bit strings, wherein each of the one or more corresponding HARQ ACK bit strings of the second sub-codebook has a second length based on a second maximum number of CBGs per TB, greater than the first length;
  receive one or more third transmissions; and
  decode the third transmissions, to generate a third sub-codebook comprising one or more corresponding HARQ ACK bit strings, wherein each of the one or more corresponding HARQ ACK bit strings of the third sub-codebook has a third length based on a third maximum number of CBGs per TB, greater than the second length.

11. The UE of claim 10, wherein the first length is 1.

12. The UE of claim 10, wherein each of the first length, the second length, and the third length is Radio Resource Control (RRC) configured.

13. The UE of claim 10, wherein the generating of the third sub-codebook comprises:
  receiving a code block group (CBG) having a number of code blocks that is greater than the second length and less than or equal to the third length;
  generating a set of HARQ ACK bits each corresponding to a respective one of the code block groups; and
  padding the set of HARQ ACK bits to form a HARQ ACK bit string having the third length.

14. The UE of claim 10, wherein the generating of the second sub-codebook comprises:
  receiving a code block group (CBG) having a number of code blocks that is greater than the first length and less than or equal to the second length;
  generating a set of HARQ ACK bits each corresponding to a respective one of the code block groups; and
  padding the set of HARQ ACK bits to form a HARQ ACK bit string having the second length.

15. The UE of claim 10, wherein the processing circuit is further configured to:
  receive a Count Downlink Assignment Indicator (C-DAI) for the second transmissions and a Total Downlink Assignment Indicator (T-DAI) for the second transmissions;
  determine, from the C-DAI and from the T-DAI, that a transmission, of the second transmissions, was missed; and
  include in the second sub-codebook a bit string, having the second length, of negative acknowledgement bits.

16. The UE of claim 15, wherein the processing circuit is further configured to:
  receive a C-DAI for the third transmissions and a T-DAI for the third transmissions, the C-DAI for the third transmissions being different from the C-DAI for the second transmissions, and the T-DAI for the third transmissions being different from the T-DAI for the second transmissions;
  determine, from the C-DAI for the third transmissions and from the T-DAI for the third transmissions, that a transmission, of the third transmissions, was missed; and
  include in the second sub-codebook a bit string, having the third length, of negative acknowledgement bits.

17. The UE of claim 15, wherein the processing circuit is further configured to:
  receive, with the C-DAI for the second transmissions and the T-DAI for the second transmissions, a T-DAI for the third transmissions;
  determine, from the C-DAI for the third transmissions and from the T-DAI for the third transmissions, that a transmission, of the third transmissions, was missed; and
  include in the second sub-codebook a bit string, having the third length, of negative acknowledgement bits.

18. The UE of claim 10, wherein the processing circuit is further configured to:
  receive, by the UE, one or more fourth transmissions; and
  decode, by the UE, the fourth transmissions, to generate a fourth sub-codebook comprising one or more corresponding HARQ ACK bit strings each having a fourth length, greater than the third length.

19. A User Equipment (UE), comprising:
a radio; and
means for processing,
the means for processing being configured to:
  receive one or more first transmissions;
  decode the first transmissions, to generate a first sub-codebook comprising one or more corresponding Hybrid Automatic Repeat Request Acknowledgement (HARQ ACK) bit strings, wherein each of the one or more corresponding HARQ ACK bit strings of the first sub-codebook has a first length based on a first maximum number of code block groups (CBGs) per transport block (TB);
  receive one or more second transmissions;
  decode the second transmissions, to generate a second sub-codebook comprising one or more corresponding HARQ ACK bit strings, wherein each of the one or more corresponding HARQ ACK bit strings of the second sub-codebook has a second length based on a second maximum number of CBGs per TB, greater than the first length;
  receive one or more third transmissions; and
  decode the third transmissions, to generate a third sub-codebook comprising one or more corresponding HARQ ACK bit strings, wherein each of the one or more corresponding HARQ ACK bit strings of the third sub-codebook has a third length based on a third maximum number of CBGs per TB, greater than the second length.

20. The UE of claim 19, wherein the first length is 1.

* * * * *